United States Patent
Uchida et al.

[11] 3,811,090
[45] May 14, 1974

[54] AUTOMATIC STOPPER SYSTEM FOR STOPPING A POWER SUPPLY IN THE ABSENCE OF INFORMATION SIGNALS

[75] Inventors: Kosaku Uchida, Neyagawa; Yoshito Dezaki, Kyoto; Sadafumi Kitamura, Neyagawa, all of Japan

[73] Assignee: Matsushita Electric Industrial Co., Ltd., Osaka, Japan

[22] Filed: May 31, 1972

[21] Appl. No.: 258,366

[30] Foreign Application Priority Data
June 2, 1971 Japan.............................. 46-38850
June 9, 1971 Japan.............................. 46-41208
Aug. 30, 1971 Japan.............................. 46-67228

[52] U.S. Cl................ 325/390, 325/390, 178/7.3 R, 340/173 CH
[51] Int. Cl. ............................................. H04b 1/06
[58] Field of Search .......... 325/186, 392, 393, 395, 325/492, 494, 496, 390; 340/173 CH; 328/260; 178/5.6, 5.8 R, 7.3 R, 7.5 R, DIG. 9, DIG. 11, DIG. 15

[56] References Cited
UNITED STATES PATENTS
3,378,775  4/1968  Joseph .............................. 325/393
3,597,531  8/1972  De Marinis et al................. 325/392
3,714,578  1/1973  Valdes................................ 325/393

*Primary Examiner*—Albert J. Mayer
*Attorney, Agent, or Firm*—Stevens, Davis, Miller & Mosher

[57] ABSTRACT

An automatic stopper system comprises a power supply circuit for a device capable of transmitting or reproducing specific information signals contained in an input signal, a load circuit which effects the transmission or reproduction on receipt of power from the power supply circuit and a switch circuit connected between the power supply circuit and the load circuit, characterized in that the switch circuit is opened when an output from an information detector circuit which detects the presence of the information signals ceases to be produced for a certain period of time, whereby power from the power supply circuit to the load circuit is stopped, thereby automatically stopping the useless reception of information to improve the safety of operation.

4 Claims, 8 Drawing Figures

AUTOMATIC STOPPER SYSTEM FOR STOPPING A POWER SUPPLY IN THE ABSENCE OF INFORMATION SIGNALS

The present invention relates to a circuit which operates in response to a piece of information a predetermined time after the information is received by an electrical signal circuit.

Generally, in a system for transmitting or reproducing a specific information signal, it is not necessary to operate the transmitting or reproducing circuit in the absence of the information signal. Otherwise, not only a waste of power but a shorter life and easier breakdowns of circuit elements will result. A television receiver, for example, which is so constructed that a power supply circuit is turned off in the absence of television broadcasting radio waves will be least affected by such adverse factors.

However, in a case where the information signals are applied intermittently or at regular intervals, or where there is an unused channel at the time of operation of a television receiver, it is necessary to prevent the circuit operation from stopping after receipt of a piece of information or at the time of switching to a different channel. To overcome this difficulty, it should be so arranged that the circuit operation is stopped when the information or television broadcasting radio wave is not applied continuously for a period longer than the period from the receipt of a piece of information to the receipt of another or the period required to pass the unused channel for channel selection.

Accordingly, it is an object of the present invention to provide a system for automatically stopping the operation of an information transmitting and reproducing system when the transmission or reproduction of information ceases for a predetermined period of time continuously.

Another object of the invention is to provide a system comprising a first timer employing an electricity memory element which produces an output a certain time after the start of operation of the timer following the detection of the absence of information, said certain time being determined by the amount of electricity memorized and the current flowing through the timer and a second timer including an integrating circuit inserted in the stage preceding the first timer, whereby in the absence of information signals for a relatively short period the first timer is prevented from being energized, thereby preventing erroneous operation.

Still another object of the invention is to provide an automatic stopper system comprising a circuit for completely resetting the residual amount of electricity before storing the predetermined amount of electricity in the memory element of the timer in order to render more practical the timer and the device for cutting off the circuit system by means of the output of the timer, so that the circuits in the stages following the timer do not operate erroneously during the time when the amount of electricity is being reset by the circuit.

A fourth object of the invention is to provide an automatic stopper system comprising a charging-discharging circuit with a predetermined time constant instead of the timer with the electricity memory element, whereby a suitable circuit is cut off by the output from the charging-discharging circuit when the information is absent for a predetermined period of time.

A fifth object of the invention is to provide an automatic stopper system as applied to a television receiver, in which there is no erroneous operation at the time of tuning to an unused channel and the power supply circuit is cut off only on completion of television broadcasting, thus acting conveniently as a sleep timer.

The above and other objects, features and advantages will be made apparent by the detailed description taken in conjunction with the accompanying drawings, in which:

Figure 1:
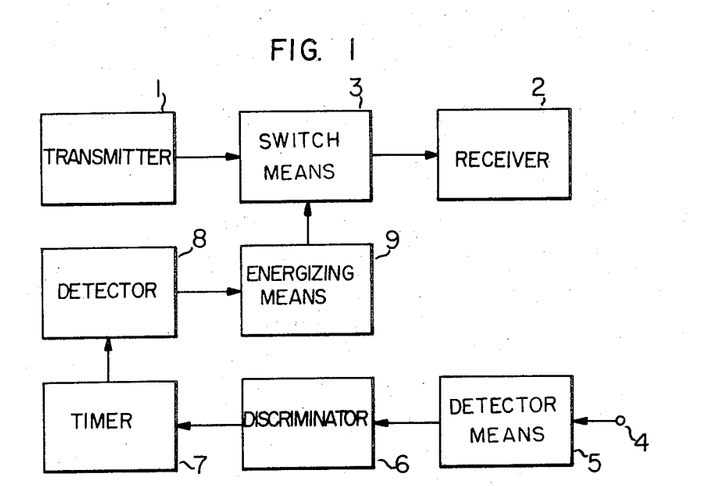
FIG. 1 is a block diagram showing the configuration of the system according to the present invention.

The outline of the construction of the automatic stopper system according to the present invention is shown in FIG. 1. The reference numeral 1 shows a circuit from which are supplied electrical signals or power needed to transmit or reproduce information signals contained in an input signal. Numeral 2 shows a receiver to which are applied the electrical signals or power from the circuit 1, numeral 3 a switching means for turning on and off a circuit for transmitting electrical signals, numeral 4 an input terminal, numeral 5 an information detector means for producing an output signal in the absence of an information signal in the input signal, numeral 6 a discriminator for producing an output signal when the input signal continues to be applied thereto for a predetermined normal period of time, numeral 7 a timer which is energized in response to an output from the circuit 6, numeral 8 a circuit for detecting the output signal from the timer 7, and numeral 9 a switch actuating or energizing means for turning off said switching means 3 in response to an output from the timer output detector 8.

Explanation will be made now of the flow of signals in the circuit arrangement shown in FIG. 1. Any signal applied to the input terminal 4 from the receiver 2 is detected by the detector means 5, whereupon the discriminator 6 decides on whether the signal is qualified to energize the following operations and applies its output signal to the timer 7. On receipt of this signal, the timer 7 is energized. The completion of the timer operation is detected by the timer output detector 8, whereupon an actuating signal is applied to the actuating circuit of the energizing means 9 whereby the energizing means 9 turns on and off the switching means 3 to complete the entire operation.

Figure 2:
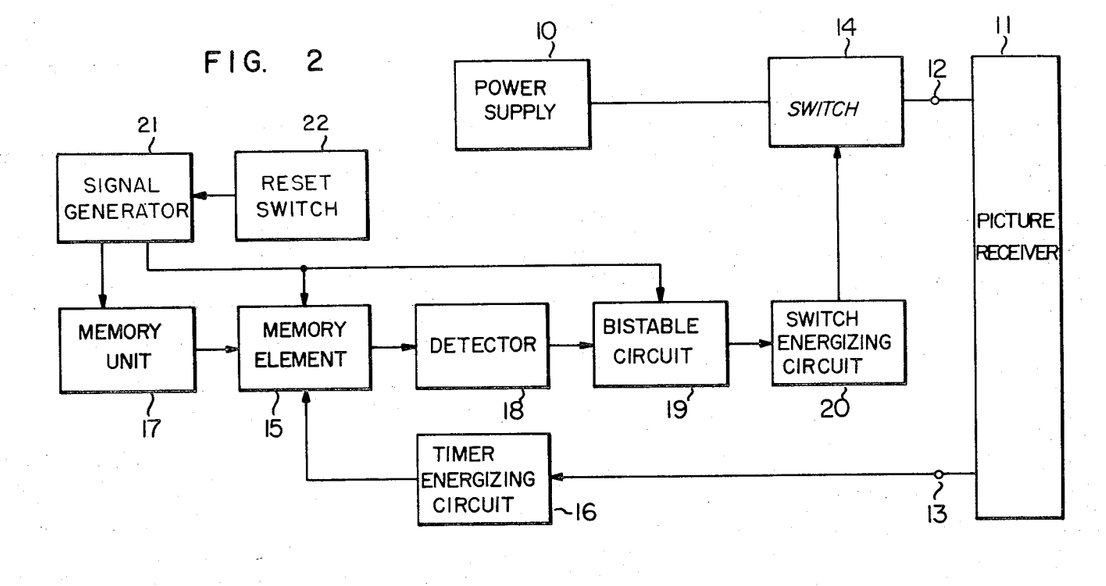
FIG. 2 is a diagram showing an embodiment of the present invention.

Now the invention will be explained with reference to an embodiment as applied to a television receiver which is so constructed that the power supply circuit is cut off in the absence of a television broadcasting radio wave. In FIG. 2 is shown an electricity memory element employed in the present invention as a timer means which is energized at a time point depending on the amount of electricity stored in advance and the value of current flowing therethrough at the time of energization thereof. In the figure, the reference numeral 10 shows a power supply, numeral 11 a picture receiver circuit which performs a receiving operation in response to power supplied from the power supply 10 through the terminal 12, and numeral 13 a detector terminal from which a predetermined voltage is produced only when the television broadcasting radio wave is not received. Numeral 14 shows a controllable switch for turning on and off the power supply circuit 10, numeral 15 a memory element provided with the electricity memory element, numeral 16 a timer energizing circuit for energizing the electricity memory element in response to the output from the detector terminal 13, and numeral 17 a memory unit for setting the quantity of electricity to be stored in the memory element 15, numeral 18 a circuit for detecting the output of the memory element 15, numeral 19 a bistable circuit which energizes the switch energizing circuit 20 in response to an output from the timer output detector 18 to open the switch 14, and numeral 22 a reset signal generator circuit for generating a signal for resetting the memory element 15 by means of the reset switch 21.

First, explanation will be made of the electricity memory element 15 and the electricity memory element contained therein used as a timer means in the preceding embodiment.

Figures 3A, 3B:
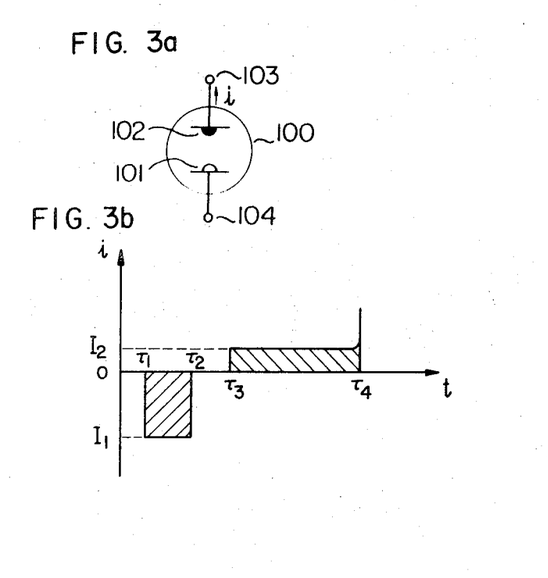
FIG. 3a is a diagram showing the outline of an electricity memory element.
FIG. 3b is a diagram for explaining the operation of the electricity memory element.

An example of the electricity memory element is shown in FIG. 3a. A couple of electrodes 101 and 102 are disposed in an electrolytic solution contained in the housing 100. The electrode 101 is made of a valve metal such as tungsten, tantalum, aluminum, titanium or riobium, and the other electrode 102 of lead, copper, silver or mercury. The electrolytic solution in which the electrodes 101 and 102 are immersed contains ions derived from the electrode 102, which ions are electrodeposited on the electrode 101. It is possible to detect the quantity of electricity which has flowed in the element by measuring the quantity of material of electrode 102 deposited on the electrode 101. If it is assumed for example that the electrodes 101 and 102 are made of tungsten and lead, respectively, lead is deposited on the tungsten electrode 101 by applying electric current from the electrode 102 to electrode 101. The quantity of lead deposited is proportional to the product of the amount of current and the time during which it flows in the element. For example, if, as shown in FIG. 3b, current $I_1$ began to be applied to the element at time point $\tau_1$ and continues to flow therein until the time point $\tau_2$, the amount of lead electrodeposited on the electrode 101 is proportional to the quantity of electricity $I_1(\tau_2 - \tau_1)$. This state is maintained and the quantity of electricity memorized, after the current is cut off.

When the direction of current is reversed, the lead deposited on the tungsten electrode 101 is ionized and returns onto the electrode 102. When the lead on the tungsten electrode 101 is all ionized, the current is substantially cut off by the rectifying function of the electrode 101 due to the oxide film on it. Assuming that current $I_2$ begins to flow at time point $\tau_3$ and is cut off at time point $\tau_4$, electricity in the quantity of $I_2(\tau_4 - \tau_3)$ is discharged. In this case, the discharge time $(\tau_4 - \tau_3)$ can be set at a desired value by controlling current $I_2$ or the quantity of electricity stored. Another feature of the above-described memory element is to produce a pulse current as shown in the drawing after the stored electricity has been discharged. It is easy to construct the electricity memory element 15 with this memory element.

Figure 4:
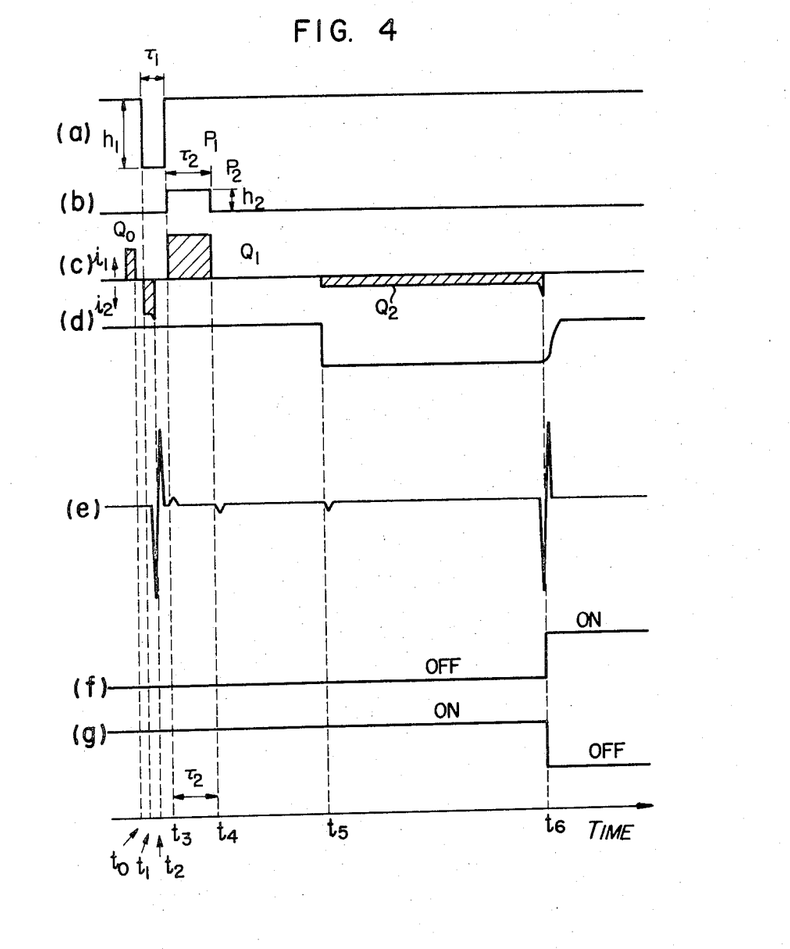
FIG. 4 is a diagram for explaining the operation of the embodiment of FIG. 2 and shows waveforms produced by the various sections of the system according to the invention.

Waveforms produced by various parts of the system of FIG. 2 are shown in FIG. 4, waveform a shows an output of the reset switch 21, waveform b an output of the circuit 17, waveform c current flowing in the memory element 15, waveform d a voltage produced at the detector terminal 13, waveform e an output of the detector 18, waveform f an output of the bistable circuit 19 and waveform g the operation of the switch 14.

The operation of the system according to the present invention will be now explained with reference to FIGS. 2 and 4. Let us assume that electricity in the quantity $Q_0$ is stored in the memory element at time point $t_0$. Turning the reset signal generator 21 ON causes the reset pulse $P_1$ to be produced from the reset switch circuit 22, whereby an erasing current flows in the memory element 15, resulting in unnecessary stored electricity being erased. On completion of this erasing operation, a pulse as shown in FIG. 4e is produced, which is detected by the detector 18. As a result, the power switch 14 is ready to be energized, but the operation of bistable circuit 19 is temporarily stopped by the reset pulse. Therefore, the switch 14 does not operate at the time of the resetting operation. With the extinguishing of the reset pulse, a memorizing current in the form of pulse $P_2$ shown in FIG. 4b for storing the electricity in a newly set quantity, flows in the memory element by the agency of the circuit 17 which operates in response to the completion of production of the reset pulse. Thus, the timer is completely ready for operation. The quantity of electricity $Q_1$ memorized as shown in FIG. 4c is controlled by properly selecting the pulse width $\tau_2$ and pulse height $h_2$. The width $\tau_1$ and height $h_1$ of pulse $P_1$ must be such as to allow current to flow sufficiently to erase the residual electricity $Q_0$.

Assume now that the broadcasting program received by the television receiver 11 ends and a negative voltage as shown in FIG. 4d is generated from the terminal 13 at time $t_5$. This negative voltage is detected by the timer energizing circuit 16, whereby the memory element 15 is energized and an erasing current begins to flow in the electricity memory element as shown in FIG. 4c. Since the erasing operation ceases when the stored electricity $Q_1$ and erased electricity $Q_2$ become equal to each other, the erasing period can be determined by making the value of the erasing current constant. The higher the erasing current value, the shorter the erasing period, and vice versa. At the end of the erasing operation, a pulse as shown in FIG. 4e is produced from the memory element. This pulse is detected by the detector 18 thereby triggering and reversing the operation of the bistable circuit 19, as illustrated in FIG. 4f. The switch energizing circuit 20 is energized through the bistable circuit, with the result that switch 14 is opened, cutting off the power supply for the television receiver. In this case, it is so arranged that a sharp voltage change at the end of the erasing operation is made in the form of a pulse voltage large enough to enable it to be distinguished from other voltage changes. Also, in order to prevent the erroneous energization of the bistable circuit 19 with a noise pulse, the rise and fall portions of pulses $P_1$ and $P_2$ are made less sharp.

When television broadcasting has ended, a signal indicating the end may be picked up by any of the following three methods: first, by utilizing an AGC voltage; second, by using a voltage generated when it is so arranged that the current in the diode of the frequency discriminator for audio channels is passed through a resistor; and third, by utilizing a voltage obtained by amplifying and detecting a carrier wave of the received signals through a narrow-band amplifier.

In the above-described arrangement, the power switch is opened automatically a certain time after the completion of a television broadcasting. Since there is no output of the detector 18, the turning on of the reset switch causes the bistable circuit 19 and hence the energizing circuit 20 to be actuated, thus regaining the operation. When it is desired to stop the operation of the automatic switching means, a switch connected in parallel with the power switch 14 may be closed, or as an alternative the power supply for the automatic switching means is cut off while closing the switch 14. Further, the reset switch and the pulse generator may be incorporated into a single pulse generator producing a pulse in the form of a combination of the pulses $P_1$ and $P_2$. The same effect is obtained by arranging for pulses $P_1$ and $P_2$ to rise at the same time and lengthening their pulse widths. The period of time from the point when information signals cease to be received to the point when the switch 14 is opened is determined either by controlling the value of current memorized in and erased from the memory element or by changing the setting pulse.

Figure 5:
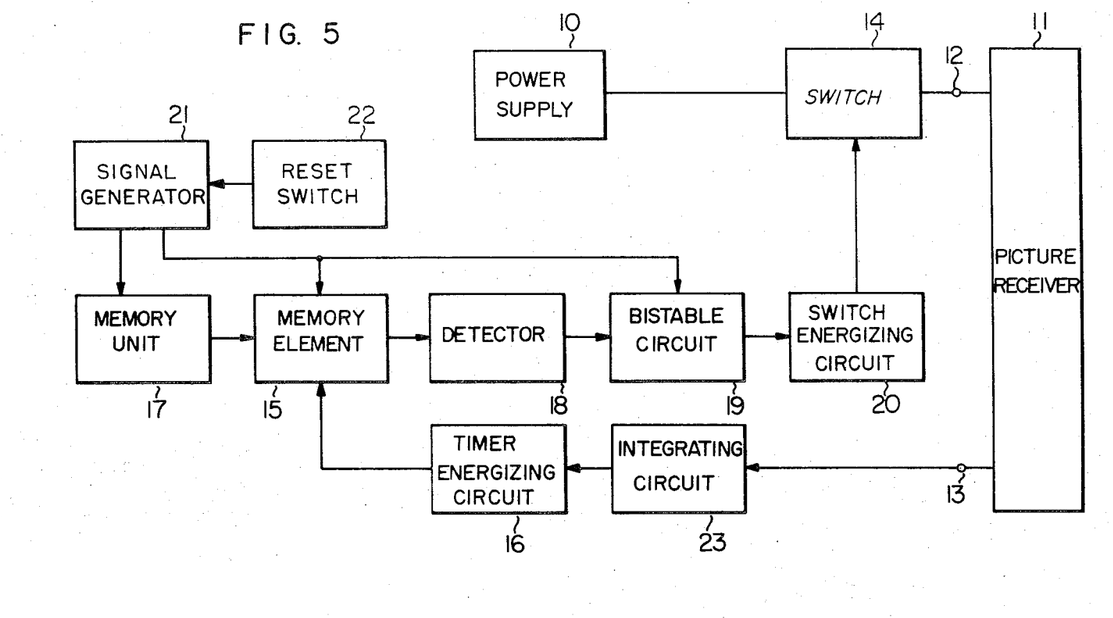
FIG. 5 is a diagram showing an improvement on the embodiment of the invention.
Figure 6:
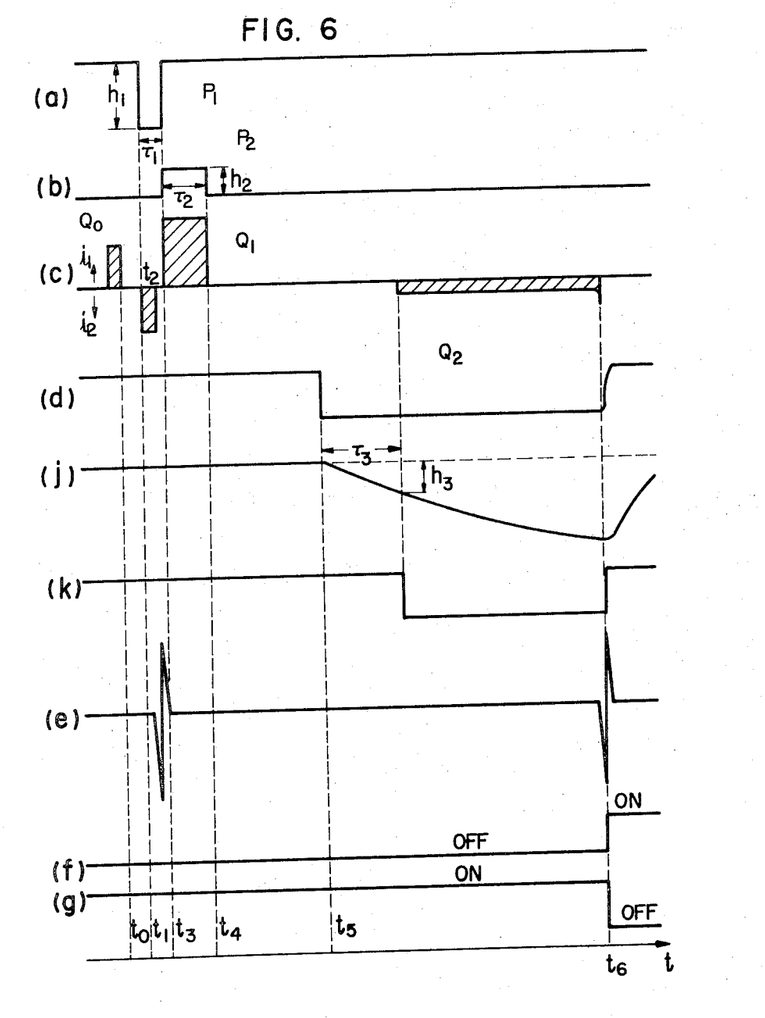
FIG. 6 is a diagram for explaining the operation of the improvement of FIG. 5 and shows waveforms produced by various sections of the system according to the invention.

Another embodiment employing the memory element is shown in FIG. 5. In this embodiment, an integrating circuit is inserted between the detector terminal 13 and the energizing circuit 16 of the preceding embodiment, so that the timer is not energized by the timer energizing circuit 16 and the memory element 15 and an output indicating the end of broadcasting continues to be produced from detector terminal 13 for a predetermined period of time, unless the voltage level obtained by integrating the output from the detector terminal 13 exceeds a set level. The other arrangements are the same as in the embodiment of FIG. 2, and the waveforms showing the operation of the present embodiment are as illustrated in FIG. 6. Symbol $j$ shows a waveform produced from the integrating circuit 23 and symbol $k$ a waveform from the timer energizing circuit 16, the other waveforms being identical with those shown in FIG. 4.

In the embodiment of FIG. 2, the timer of the memory element is energized by the output from the detector terminal 13 when an unused channel is passed for channel selection, and an erroneous energization of the timer takes place each time of channel selection due to the fact that there is an unused channel at almost every other channel resulting in the power supply being inconveniently cut off a certain time after the timer energization. The arrangement as shown in FIG. 5 is intended to obviate the above-mentioned disadvantage.

Figure 7:
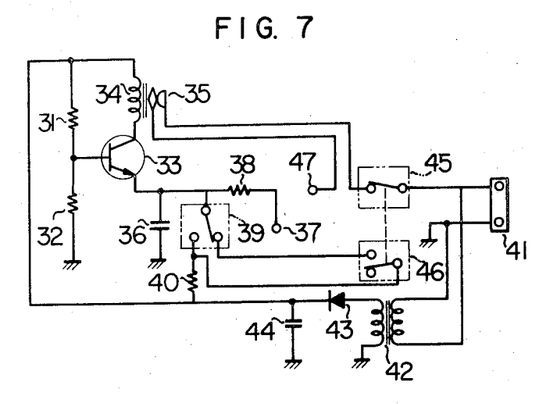
FIG. 7 is a diagram showing an embodiment of the invention which does not employ the electricity memory element.

The same effect as obtained from the preceding embodiments is achieved by the circuit arrangement shown in FIG. 7, which does not employ any memory element but utilizes the output voltage from the AGC circuit to detect the presence or absence of television radio waves. In this figure, the reference numerals 31 and 32 show base bias resistors, numeral 33 a switching transistor, numeral 34 a relay-energizing coil and numeral 35 a relay contact inserted into a power supply line. The numeral 36 shows a charging capacitor connected to the emitter of the transistor 33, numeral 37 a terminal to which a forward AGC voltage is applied, and numeral 38 a resistor through which the forward AGC voltage is applied to the emitter of the transistor 33. The numeral 39 shows a non-locking switch for applying a DC voltage to the emitter of the transistor 33 through the resistor 40, which switch is used to start the receiving operation when the power switch is closed. The numeral 41 shows a connector supplied with AC power, numeral 42 a transformer connected to the power line led from the connector 41, numeral 43 a diode for rectifying the output of the secondary winding of the transformer 42, and numeral 44 a smoothing capacitor, the smoothed output of which is applied to the resistor 40 and energizing coil 34. Numeral 45 shows a power switch connected in series with the contact 35, numeral 46 a switch operatively interlocked with the power switch 45 for short-circuiting the switch 39, and numeral 47 a terminal connected to a receiver power circuit for supplying power thereto.

The operation of the above-mentioned embodiment will be now explained. An AGC voltage is applied to the terminal 37 at the time of receiving a radio wave, at which time the emitter potential of transistor 33 is higher than the base potential determined by the resistors 31 and 32. As a result, the transistor 33 is turned off and so no current flows in the energizing coil 34 with the contact 35 closed. Under this condition, the power supplied to the connector 41 is applied through the power switch 45 and contact 35 to the terminal 47. Although the AGC voltage applied to terminal 37 is reduced when the tuner is tuned to an unused channel, the emitter potential of the transistor 33 does not immediately drop due to the charges stored in the capacitor 36, thereby maintaining the transistor 33 turned OFF for a period equivalent to the time constant determined by the output impedance of the AGC circuit, the capacitor 36 and resistor 38. By tuning to a desired channel during this period, the receiving state is maintained without interruptions. Assume now that the receiver is left as it is even after the broadcasting program has come to an end. The capacitor 36 is discharged and the transistor 33 is turned ON, so that current flows through the energizing coil 34, the transistor 33 and resistor 38 to the AGC circuit thereby to open the contact 35. As a result, electric power ceases to be supplied to the terminal 47, thereby stopping the receiving operation.

In this case, it is necessary to maintain the resistance value of the resistor 38 and the output impedance of the AGC circuit sufficiently low in order that a sufficient amount of current may flow in the energizing coil 34. When the receiving operation is stopped with the power switch 45 closed, the emitter potential of the transistor 33 is raised through the resistor 40 by temporarily closing the switch 39, thereby cutting off the transistor 33. The contact 35 is again closed and power is supplied to the terminal 47 thereby starting the receiving operation again. Once the receiving operation is started, the AGC voltage is applied to the terminal 47, so that the receiving state is maintained even if the switch 39 is opened.

As long as the power switch 45 is open, no power is supplied to the terminal 37 and therefore no receiving operation is performed. However, since the switch 46 is closed, the capacitor 36 is charged. Accordingly, when the power switch 45 is closed, the switch 46 opens immediately, but the transistor 33 is maintained OFF due to the electric charge of the capacitor 36. As a result, power is supplied to the terminal 47 to start the receiving operation.

A reverse AGC voltage may be utilized instead of the forward AGC voltage used in the embodiment of FIG. 7. Also, the same advantage as when both the switches 39 and 46 are provided is obtained if the switch 39 is removed. In this case, however, it is necessary to change the power switch 45 from opened to closed states in order to start the receiving operation, if the receiving operation is stopped with the power switch 45 closed.

The above explanation of the embodiments were made with reference to the television receiver, but it is obvious that the present invention is not limited to it but can be applied to a radio receiver and other general transmitting systems where it is desirable to start a certain operation in response to certain information a predetermined time after the information is received.

As will be seen from the explanation of the preceding embodiments, according to the present invention, the power supply of the circuit itself is cut off automatically a certain time after the circuit indicates a non-operative condition, thereby preventing protraction of the state of meaningless reception for improved safety. Further, less degeneration of the circuit with time results, thereby always securing a stable and reliable operation. Especially, the system employing a memory element for memorizing the quantity of electricity is so reliable that a very safe operation and highly improved characteristics are obtained.

What is claimed is:

1. In an apparatus for reproducing information carried on a television signal, an automatic stopper system for stopping the power supply when the television information signal is absent for a certain period of time, comprising:

a. detector means for detecting the absence of the television information signal and generating a detecting signal in response to the detection thereof;

b. circuit means for generating a predetermined signal in response to reception of the detecting signal from the detector means;

c. timer means, which starts to operate in response to the predetermined signal from the circuit means, for generating a timer signal when the absence of the television information signal continues for a predetermined time length, said timer means including an electrical memory element having a shield housing containing two opposed electrodes, one of which is made of a valve metal, said electrodes being disposed in an electrolytic solution;

d. means including a bistable circuit means, driven by the timer signal, for de-energizing a power switch for stopping the power from a power supply; and e. erasing means for erasing a remaining quantity of electricity in the electrical memory element at the time of the switching in of the power for the apparatus for reproducing, said erasing means, during erasing, stopping the operation of said means for de-energizing the power switch, said electrical memory element memorizing a predetermined quantity of electricity after erasing.

2. An automatic stopper system as claimed in claim 1 wherein said detector means for detecting the absence of the television information signal detects the absence of an audio signal included in the television information signal.

3. An automatic stopper system as claimed in claim 1 wherein said detector means for detecting the absence of the television information signal detects the absence of an AGC signal included in the television information signal.

4. An automatic stopper system as claimed in claim 1 wherein said detector means for detecting the absence of the television information signal detects the absence of an image detecting output signal included in the television information signal.

* * * * *